US00RE40524E

(19) United States
(12) Reissued Patent
Iwasaki et al.

(10) Patent Number: US RE40,524 E
(45) Date of Reissued Patent: Sep. 30, 2008

(54) MAGNET POWDER-RESIN COMPOUND PARTICLES, METHOD FOR PRODUCING SUCH COMPOUND PARTICLES AND RESIN-BONDED RARE EARTH MAGNETS FORMED THEREFROM

(75) Inventors: Katsunori Iwasaki, Shimane-ken (JP); Kazunori Tabaru, Saitama-ken (JP)

(73) Assignee: Hitachi Metals, Ltd., Tokyo (JP)

(21) Appl. No.: 10/894,481
(22) Filed: Jul. 20, 2004

Related U.S. Patent Documents

Reissue of:
(64) Patent No.: 6,423,386
Issued: Jul. 23, 2002
Appl. No.: 09/286,419
Filed: Apr. 6, 1999

(30) Foreign Application Priority Data

Apr. 6, 1998 (JP) ..... 10-110153

(51) Int. Cl.
*H01F 1/00* (2006.01)

(52) U.S. Cl. ..... 428/34.5; 428/34.1; 428/35.7; 428/900; 148/100; 148/101; 148/105; 148/300; 148/301; 148/302; 148/306; 148/311; 148/313

(58) Field of Classification Search ..... 428/34.1, 428/34.5, 35.7, 36.4, 900; 29/607; 335/302; 420/83; 148/100, 101, 105, 300, 301, 302, 148/306, 311, 313
See application file for complete search history.

(56) References Cited

U.S. PATENT DOCUMENTS 4,960,469 A * 10/1990 Tanigawa et al. ..... 148/105
5,085,715 A * 2/1992 Tokunaga et al. ..... 148/101

FOREIGN PATENT DOCUMENTS

JP 132106 A1 * 5/1989
JP 11-45816 * 6/1989
JP 10-4023 A * 1/1998
JP 11-45816 * 2/1999

* cited by examiner

*Primary Examiner*—Alicia Chevalier
(74) *Attorney, Agent, or Firm*—Sughrue Mion, PLLC

(57) ABSTRACT

The magnet powder-resin compound particles substantially composed of rare earth magnet powder and a binder resin are in such a round shape that a ratio of the longitudinal size a to the transverse size b (a/b) is more than 1.00 and 3 or less, and that an average particle size defined by (a/b)/2 is 50–300 μm. They are produced by charging a mixture of rare earth magnet powder and a binder resin into an extruder equipped with nozzle orifices each having a diameter of 300 μm or less; extruding the mixture while blending under pressure though the nozzle orifices to form substantially cylindrical, fine pellets; and rounding the pellets by rotation.

4 Claims, 13 Drawing Sheets

100 μm

100 μm

100 μm

100 μm

MAGNET POWDER-RESIN COMPOUND PARTICLES, METHOD FOR PRODUCING SUCH COMPOUND PARTICLES AND RESIN-BONDED RARE EARTH MAGNETS FORMED THEREFROM

Matter enclosed in heavy brackets [ ] appears in the original patent but forms no part of this reissue specification; matter printed in italics indicates the additions made by reissue.

BACKGROUND OF THE INVENTION

The present invention relates to a resin-bonded rare earth magnet having good dimensional accuracy and high magnetic properties, particularly to a resin-bonded rare earth magnet in a thin and/or long shape. The present invention also relates to magnet powder-resin compound particles suitable for producing thin and/or long, resin-bonded rare earth magnets and a method for producing such magnet powder-resin compound particles.

Magnet powder widely used for resin-bonded rare earth magnets is generally isotropic magnet powder based on a main phase of an $Nd_2Fe_{14}B$-type intermetallic compound, which is produced by rapidly quenching an alloy melt having a composition comprising an $Nd_2Fe_{14}B$-type intermetallic compound as a main phase to form an amorphous alloy, and after pulverization, if necessary, subjecting the amorphous alloy to a heat treatment to crystallize the $Nd_2Fe_{14}B$-type intermetallic compound. In addition, an alloy having the above composition may be melted and cast by a strip casting method, a high-frequency melting method, etc., pulverized, and then subjected to hydrogenation, phase decomposition, dehydrogenation and recrystallization treatment (see Japanese Patent 1,947,332), thereby providing anisotropic magnet powder having a fine recrystallized structure for resin-bonded magnets. This magnet powder has an $Nd_2Fe_{14}B$-type intermetallic compound as a main phase. The anisotropic magnet powder having a fine recrystallized structure based on an $Nd_2Fe_{14}B$-type intermetallic compound may also be produced by pressing the above thin, amorphous alloy ribbons or flakes at high temperatures by a hot press, etc., and subjecting the resultant thin alloy compact to plastic working such as upsetting, etc.

Recently, resin-bonded rare earth magnets have been required to be as thin as possible with high magnetic properties and dimensional accuracy. When used for electronic buzzers of mobile telecommunications equipment, for instance, gaps between the magnets and vibration plates are controlled to adjust tone quality. Because their assembling is performed in automated lines, it is necessary to improve the dimensional accuracy of electronic buzzers including resin-bonded rare earth magnets for achieving higher performance. Also, high magnetic properties, smaller thickness and strict dimensional accuracy are required for the resin-bonded rare earth magnets for use in spindle motors in hard-disk drives in computers and motors in CD-ROM drives, and further DVD (digital video disk) drives, etc. in the future. Further, integral, long, resin-bonded rare earth magnets are needed, because they make bonding by adhesives unnecessary, thereby eliminating bonding lines and thus reducing the number of assembling steps while improving magnetic properties. Integral, thin, long, resin-bonded rare earth magnets are also demanded.

The term "long" used herein means 10 mm or more in length, and the term "thin" used herein means 3 mm or less in thickness. Thus, it is recently demanded that resin-bonded rare earth magnets be as thin as and/or as long as possible while increasing magnetic properties and dimensional accuracy.

The magnetic properties and dimensional accuracy of thin and/or long, resin-bonded rare earth magnets are largely affected by forming methods and the shapes of magnet powder-resin compound particles. The forming methods of the resin-bonded rare earth magnets include a compression molding method, an injection molding method, an extrusion molding method, etc.

In the case of the compression molding method, magnet powder-resin compound particles for resin-bonded rare earth magnets are charged into a cavity of a molding die and compressed under pressure. Thereafter, heat curing is carried out to produce the resin-bonded rare earth magnets with high mechanical strength and dimensional accuracy. Recent development of compression molding technology such as mechanical pressing and rotary pressing has realized high-speed molding. However, as the resin-bonded magnets become thinner and/or longer, it becomes difficult to charge magnet powder into a die cavity, and it becomes insufficient to exert compression pressure particularly in a depth direction (compression direction). As a result, the resultant resin-bonded magnets have such an uneven density distribution that end portions to which compression pressure is directly applied have a higher density, while a center portion has a lower density. This uneven density distribution leads to uneven magnetic properties and dimensional accuracy among the products.

The injection molding method is advantageous in that it can easily provide moldings formed thereby with various shapes, though the moldings have relatively uneven density distributions like those produced by compression molding. Molding tact is important in the injection molding method, and the above-described progress of pressing technology has deprived the injection molding method of what is conventionally considered advantages, namely high molding efficiency that produces many moldings at the same time. Because magnet powder-resin compound particles are required to have good moldability (flowability), they have to contain high percentages of binder resins. Thus, resin-bonded rare earth magnets formed by the injection molding method have lower magnetic properties than those formed by the compression molding method or the extrusion molding method.

When the extrusion molding method is used, the percentages of magnet powder in the magnet powder-resin compound particles are higher than those produced by the injection molding method, but lower than those produced by the compression molding method. Accordingly, the resin-bonded rare earth magnets formed by the extrusion molding method have magnetic properties between those of the injection molding method and those of the compression molding method. Though the extrusion molding method is suitable for producing long moldings, such moldings have relatively uneven density distributions like those formed by the compression molding method.

The blending of rare earth magnet powder with a binder resin (corresponding to pre-blending in the present invention) has conventionally been carried out by a double-screw extruder, etc., followed by pelletizing to produce magnet powder-resin compound pellets. The conventional magnet powder-resin compound pellets contain considerable pores and are in a ragged irregular shape showing poor flowability (moldability). When such conventional magnet powder-resin compound pellets are subjected to compression molding, the resultant thin and/or long, resin-bonded rare earth magnets have large unevenness in their density distribution, posing the problems that the density is higher in both ends portions to which a compression pressure is applied than in a center portion. In the case of solid-cylindrical, resin-bonded rare earth magnets, their outer diameters have poor circularity. Also, in the case of ring-shaped, resin-bonded rare earth magnets, their outer and inner diameters have poor circularity. When the ring-shaped, resin-bonded rare earth magnets having poor circularity are used for rotors, the rotors have large eccentricity, resulting in large unevenness in gaps between the rotors and the stators. Also, to prevent the rotors from being brought into contact with the stators, the air gaps should be designed taking into consideration the eccentricity of the rotors. This makes it difficult to construct high-efficiency motors.

OBJECT AND SUMMARY OF THE INVENTION

Accordingly, an object of the present invention is to provide a resin-bonded rare earth magnet having good dimensional accuracy and high magnetic properties, particularly a thin and/or long, resin-bonded rare earth magnet.

Another object of the present invention is to provide magnet powder-resin compound particles for producing such a resin-bonded rare earth magnet.

A further object of the present invention is to provide a method for producing such magnet powder-resin compound particles.

The inventors have found that fine, round magnet powder-resin compound particles having a high density (free from pores) can be produced by charging pre-blended, magnet powder-resin pellets into an extruder equipped with nozzle orifices each having a diameter of 300 μm or less, extruding them through the nozzle orifices to form higher-density extrudate particles, and then charging the extrudate particles into a rounding apparatus in which the extrudate particles are cut and rounded simultaneously. The inventors have also found that such fine, round magnet powder-resin compound particles can be compression-molded to form resin-bonded rare earth magnets having extremely suppressed unevenness in density with high magnetic properties and good dimensional accuracy. The present invention has been completed based on these findings.

The present invention thus provides a method for producing magnet powder-resin compound particles for resin-bonded rare earth magnets comprising the steps of charging a mixture substantially composed of rare earth magnet powder and a binder resin into an extruder equipped with nozzle orifices each having a diameter of 300 μm or less; extruding the mixture while blending under pressure though the nozzle orifices to form substantially cylindrical, fine pellets; and rounding the pellets by rotation.

The magnet powder-resin compound extruded through the nozzle orifices is in the form of substantially cylindrical, fine pellet having substantially the same diameter as that of each nozzle orifice. The pellets are then formed into fine, round particles under the action of a shearing force and a centrifugal force is Marumerizer or a dry spray apparatus, etc. When the fine, round magnet powder-resin compound particles are compression-molded, the resultant thin and/or long, resin-bonded magnets have extremely small unevenness in density distribution with much better magnetic properties and dimensional accuracy than the conventional resin-bonded magnets.

The present invention also provides a resin-bonded rare earth magnet substantially composed of an R—T—B alloy powder, wherein R is at least one rare earth element including Y, and T is Fe or Fe+Co, and a binder resin, said R—T—B alloy powder comprising an $R_2T_{14}B$-type intermetallic compound as a main phase and having an average crystal grain size of 0.01–0.5 μm, and wherein the resin-bonded rare earth magnet is in a thin and/or long ring shape having a thickness defined by (outer diameter - inner diameter)/2 of 0.3–3 mm and a height of 50 mm or less, the deviation of an outer periphery of the resin-bonded rare earth magnet from the circle being 15 μm or less.

The present invention further provides a resin-bonded rare earth magnet substantially composed of an R—T—B alloy powder, wherein R is at least one rare earth element including Y, and T is Fe or Fe+Co, and a binder resin, said R—T—B alloy powder comprising an $R_2T_{14}B$-type intermetallic compound as a main phase and having an average crystal grain size of 0.01–0.5 μm, wherein the resin-bonded rare earth magnet is in a solid-cylindrical shape having an outer diameter of 50 mm or less and a height of 50 mm or less, wherein the resin-bonded rare earth magnet has such a density distribution that the density is higher in both ends portions than in a center portion, the difference between the highest density and the lowest density being 0.3 g/cm$^3$ or less, and wherein the deviation of an outer periphery of the resin-bonded rare earth magnet from the circle is 15 μm or less.

DETAILED DESCRIPTION OF THE PREFERRED EMBODIMENTS

In the present invention, magnet powder-resin compound particles for resin-bonded rare earth magnets are produced by charging a mixture substantially composed of rare earth magnet powder and a binder resin into an extruder equipped with nozzle orifices each having a diameter of 300 μm or less; extruding the mixture while blending under pressure though the nozzle orifices to form substantially cylindrical, fine pellets; and rounding the pellets by rotation.

Figure 13:
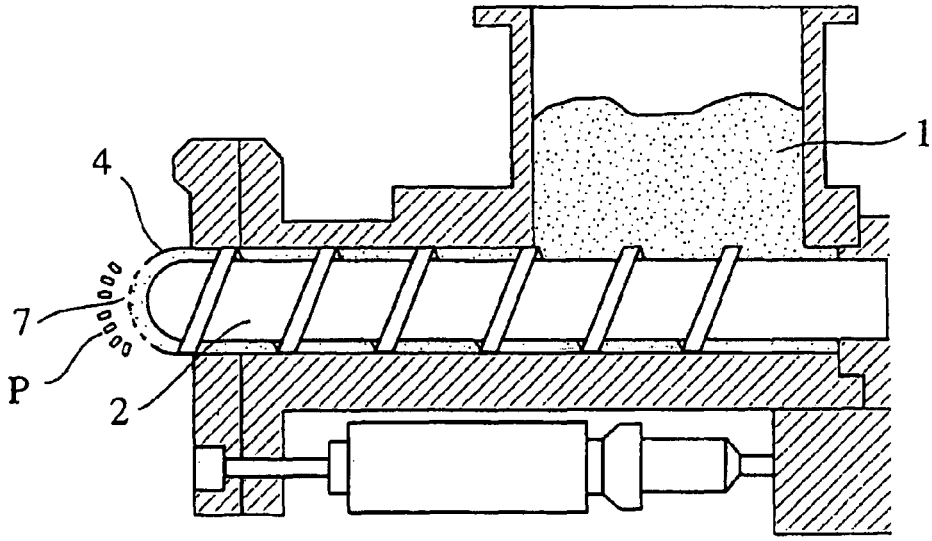
FIG. 13(a) is a cross-sectional view showing a typical example of the extruder equipped with a die for forming substantially cylindrical, fine pellets according to the present invention.
FIG. 13(b) is a cross-sectional view showing a typical example of a rotary pelletizer for rounding substantially cylindrical, fine pellets to fine, round, magnet powder-resin compound particles.
FIG. 13(c) is a plan view showing a typical example of a rotatable pan on which substantially cylindrical, fine pellets are divided and rounded.
FIG. 13(d) is an enlarged cross-sectional view showing a typical example of grooves on the rotatable pan shown in FIG. 13(c)
FIG. 13(e) is a schematic view showing a typical example of a pair of baffle blades mounted at a particular angle to a casing of the rotary pelletizer.
Figure 13:
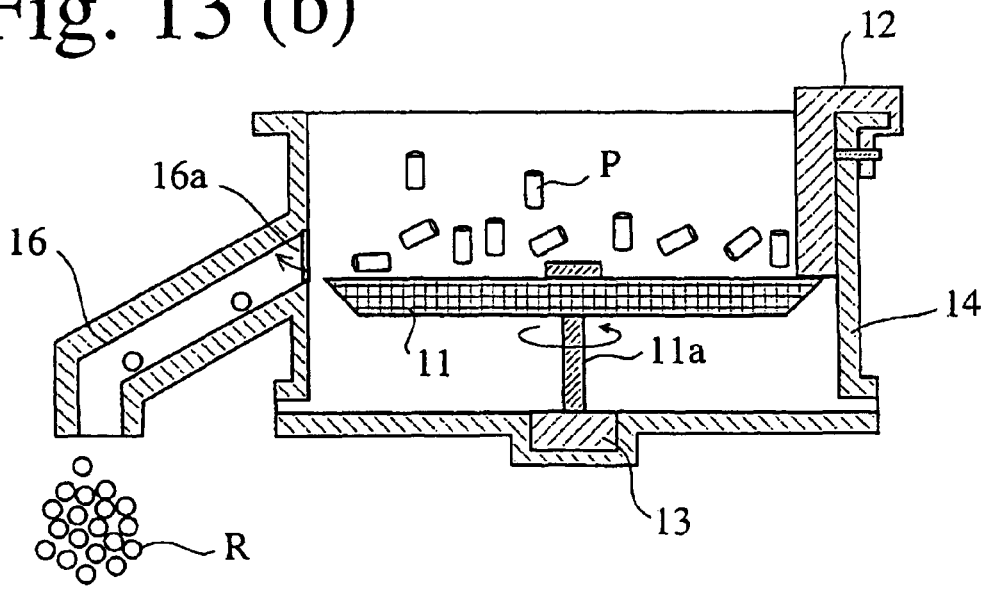
Figure 13:
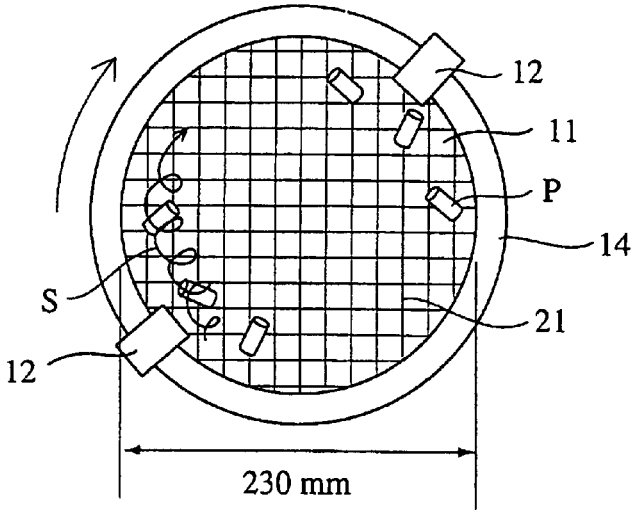
Figure 13:
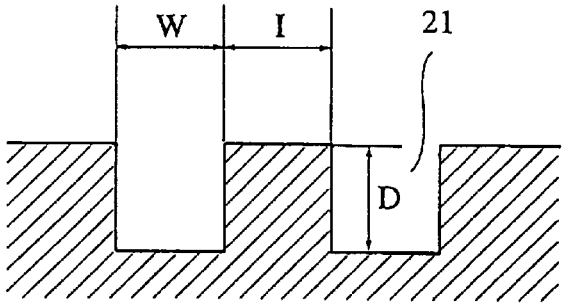
Figure 13:
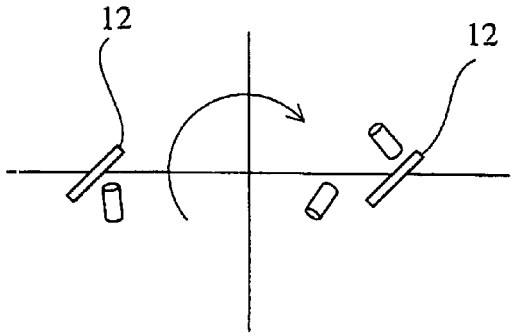

The rounding the pellets is preferably carried out by a rotary pelletizer typically shown in FIGS. 13 (b)–(e). As shown in FIG. 13(b), the rotary pelletizer comprises a rotatable pan 11 for dividing and rounding the substantially cylindrical, fine pellets P, a center shaft 11a connected to the rotatable pan 11 and a motor 13, and a pair of baffle blades 12 supported by a casing 14. The casing 14 has a trough 16 provided with a valve 116a for withdrawing rounded fine compound particles R from the rotatable pan 11.

The rotatable pan 11 has a plurality of grooves 21 extending in a checkerboard pattern as shown in FIG. 13(c). In a typical example shown in FIG. 13(d), each groove 21 has a width W of 0.4–1.2 mm, particularly about 0.8 mm, and a depth D of 0.6–1.0 mm, particularly about 0.8 mm. An interval I between the adjacent grooves 21 may be 0.4–2 mm, particularly about 0.8 mm. Outside these ranges, efficient dividing and rounding cannot be carried out on the pellets P.

A pair of baffle blades 12 are fixed at an angle of 30–70°, preferably 40–50°, particularly about 45° relative to a diameter of the rotatable pan 11, so that rotating pellets P frequently impinge against them as shown in FIG. 13(e). When the angle of each baffle blade 12 is less than 30°, the pellets P accumulates at the baffle blades 12, resulting in drastic decrease in dividing and rounding efficiency. On the other hand, when the angle of each baffle blade 12 exceeds 70°, effects of accelerating the spiral rotation of the pellets P disappear.

The substantially cylindrical, fine pellets P are charged into the rotary pelletizer so that they are rotated on the rotatable pan 11. During the rotation, pellets P are divided and rounded by falling into the grooves 21 and impinging against the baffle blades 12. The reasons why such dividing and rounding action take place are considered as follows:

Because the substantially cylindrical, fine pellets P are heavy, they tend to be trapped in grooves 21 on a periphery side of the rotatable pan 11 subjected to the highest circumferential speed. If this happens, sufficient dividing and rounding action do not take place. The dividing and rounding of the pellets P can proceed if a twisting force is applied to the substantially cylindrical, fine pellets P, namely if the pellets P are subjected to spiraling motion as shown by S in FIG. 13(c). To cause active spiraling motion, it is important to prevent the pellets P from being trapped by the grooves 21. This can be achieved by the baffle blades 12 mounted to the casing 14. When the pellets P impinge against the baffle blades 12, a combination of a kinetic energy, a centrifugal force and trapping force causes the pellets P to undergo a spiraling motion S without being trapped by the grooves 21.

By setting optimum rounding conditions in connection with the rotation speed of the rotatable pan 11 and the shape, position and size of grooves 21, the substantially cylindrical, fine compound pellets P are divided to length substantially equal to their diameter and shaped to round, fine particles R having small specific surface areas by the rotation of the pan 11. The rounding of the substantially cylindrical, fine compound pellets P can be achieved within 5 minutes, though the rounding time may be variable within the above range depending on the rotation speed of the rotatable pan 11 and the shape, position and size of grooves 21.

When 0.01–0.5 weight % of a lubricant such as calcium stearate, etc. is added to 100 weight % of the magnet powder-resin compound particles, good flowability and pressure conveyability are obtained. When the amount of the lubricant added is less than 0.01 weight %, sufficient lubrication effects cannot be obtained. On the other hand, even when the amount of the lubricant added exceeds 0.5 weight %, further improvement in lubrication effects cannot be achieved.

Figure 14:
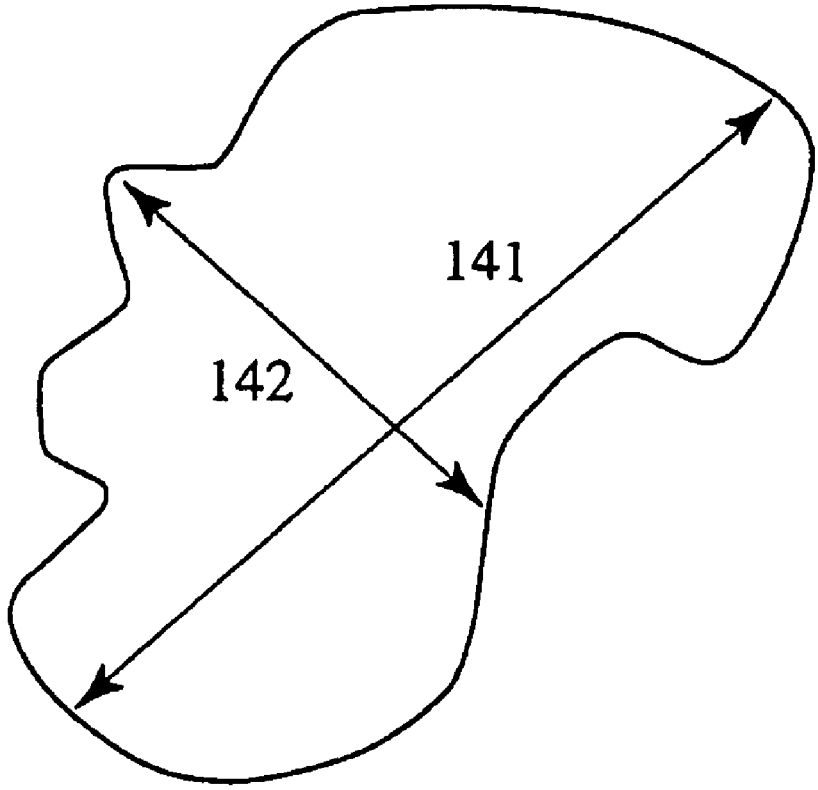
FIG. 14 is a schematic view showing the definition of longitudinal size and transverse size of a resin-bonded rare earth magnet particle.

With respect to the magnet powder-resin compound particles, magnet powder particles and the nozzle orifices, the longitudinal size is defined herein by the maximum length of each particle or cross section in their photographs. Also, the transverse size is defined herein by the maximum length in perpendicular to the direction of the longitudinal size. FIG. 14 schematically indicates the longitudinal size 141 and the transverse size 142.

In a preferred embodiment of the present invention, each of the magnet powder-resin compound particles for resin-bonded rare earth magnets substantially composed of rare earth magnet powder and a binder resin is in such a round shape that a ratio of the longitudinal size a to the transverse size b (a/b) is more than 1.00 and 3 or less, and that an average particle size defined by (a/b)/2 is 50–300 μm.

When 100 weight % of the rare earth magnet powder particles are bonded with 0.5 weight % or more and less than 20 weight % of a binder resin, the average number of the rare earth magnet powder particles having the transverse size b of 30–40 μm is 10 or more in one magnet powder-resin compound particle. Because the magnet powder-resin compound particles of the present invention undergoes high compression pressure when passing in a softened state through nozzle orifices each having a diameter of 300 μm or less, the rare earth magnet powder is densely mixed with the binder resin. Thus, 10 or more of rare earth magnet powder particles having the transverse size b of 3–40 μm are contained on average in each magnet powder-resin compound particle. When the average number of the rare earth magnet powder particles contained in one magnet powder-resin compound particle is less than 10, it is difficult to provide the resultant thin and/or long, resin-bonded rare earth magnets with improved magnetic properties and dimensional accuracy.

The shapes of the magnet powder-resin compound particles can be confirmed by a scanning electron microscopy (SEM). When (a/b) exceeds 3, the magnet powder-resin compound particles are in elongated shapes, resulting in drastic decrease in flowability that affects the easiness of supplying powder. Incidentally, it is extremely difficult to industrially produce magnet powder-resin compound particles having (a/b) of 1.00.

The average particle size (a/b)/2 of the magnet powder-resin compound particles, which is restricted by the inner diameter of each nozzle orifice, is preferably 50–300 μm. When (a/b)/2 is less than 50 μm, it is likely to be difficult to extrude the magnet powder-resin compound particles in which magnet powder having the above $R_2T_{14}B$-type intermetallic compound as a main phase is dispersed. On the other hand, when (a/b)/2 exceeds 300 μm, the magnet powder-resin compound particles have drastically decreased flowability.

The nozzle orifices may practically be formed by drilling. The nozzle orifices each having a diameter of 300 μm or less are preferably formed by laser beam or electron beam for higher dimensional accuracy. The diameter of each nozzle orifice may be determined within the range of 50–300 μm depending on the average particle size of the magnet powder-resin compound particles. When the diameter of each nozzle orifice is less than 50 μm, the magnet powder is likely to be clogged in the nozzle orifices, making extrusion difficult. On the other hand, when the diameter of each nozzle orifice exceeds 300 μm, it is difficult to improve the flowability and pressure conveyability of magnet powder-resin compound particles, and the magnetic properties and dimensional accuracy of the resultant resin-bonded rare earth magnets. Each nozzle orifice may have an elliptic, rectangular or irregular cross section. In any case, the condition that the cross section of each nozzle orifice has a longitudinal size a of 300 μm or less and a transverse size b of 50 μm or more is necessary to improve the flowability and pressure conveyability of the magnet powder-resin compound particles.

In the case of using the rapidly-quenched rare earth magnet particles having an $R_2T_{14}B$-type intermetallic compound as a main phase, the average number of the rare earth magnet particles in one magnet powder-resin compound particle is preferably 10 or more, and an upper limit of their transverse size b preferably corresponds nearly to the maximum thickness (about 40 μm) of rapidly-quenched, thin, amorphous alloy ribbons. A lower limit of their transverse size b is preferably 3 μm. When the transverse size b of the rare earth magnet powder particles is less than 3 μm, their resistance to oxidation is drastically deteriorated.

In a preferred embodiment, there is provided a resin-bonded rare earth magnet substantially composed of an R—T—B alloy powder, wherein R is at least one rare earth element including Y, and T is Fe or Fe+Co, and a binder resin, the R—T—B alloy powder comprising an $R_2T_{14}B$-type intermetallic compound as a main phase and having an average crystal grain size of 0.01–0.5 μm, and wherein the resin-bonded rare earth magnet is in a thin and/or long ring shape having a thickness of 0.3–3 mm defined by (outer diameter−inner diameter)/2 and a height of 50 mm or less, more preferably 5–50 mm, the deviation of an outer periphery of the resin-bonded rare earth magnet from the circle being 15 μm or less. The deviation of an inner periphery of this resin-bonded rare earth magnet from the circle is preferably 15 μm or less. More preferably, the deviation of outer and inner peripheries of the resin-bonded rare earth magnet from the circle is 10 μm or less.

The resin-bonded rare earth magnet has a density of 6.0 $g/cm^3$ or more with a density distribution that the density is higher in both ends portions than in a center portion, the difference between the highest density and the lowest density being preferably 0.3 $g/cm^3$ or less, more preferably 0.2 $g/cm^3$ or less in one molding (resin-bonded rare earth magnet). Thus, the resin-bonded rare earth magnet of the present invention has greatly improved evenness in a density distribution. When such resin-bonded rare earth magnets in thin and/or long ring shapes are assembled in rotors of motors, air gaps can be narrowed than conventional ones, resulting in higher-performance motors. Incidentally, outside the above ring shape, it is likely to be difficult to achieve high magnetic properties and good dimensional accuracy.

In another embodiment, the resin-bonded rare earth magnet is substantially composed of an R—T—B alloy powder, wherein R is at least one rare earth element including Y, and T is Fe or Fe+Co, and a binder resin, the R—T—B alloy powder comprising an $R_2T_{14}B$-type intermetallic compound as a main phase and having an average crystal grain size of 0.01–0.5 μm, and wherein the resin-bonded rare earth magnet is in a solid-cylindrical shape having an outer diameter of 50 mm or less, more preferably 30 mm or less, further preferably 25 mm or less and a height of 50 mm or less, wherein the resin-bonded rare earth magnet has such a density distribution that the density is higher in both ends portions than in a center portion, the difference between the highest density and the lowest density being 0.3 $g/cm^3$ or less, more preferably 0.2 $g/cm^3$ or less in one resin-bonded rare earth magnet, and wherein the deviation of an outer periphery of the resin-bonded rare earth magnet from the circle is 15 μm or less, more preferably 10 μm or less. Outside the above dimension range of the solid-cylindrical shape, it is likely to be difficult to achieve high magnetic properties and good dimensional accuracy.

The term "inner periphery" used herein means an inner circle in a doughnut-shaped cross section taken in perpendicular to the longitudinal axis of a ring-shaped or cylindrical, resin-bonded magnet, and the term "outer periphery" used herein means an outer circle in a doughnut-shaped cross section or a peripheral circle in a circular cross section.

Used as the rare earth magnet powder in the present invention is an R—T—B alloy powder having an $R_2T_{14}B$-type intermetallic compound as a main phase, wherein R is at least one rare earth element including Y, and T is Fe or Fe+Co. This magnet powder is preferably formed from an R—T—B alloy comprising 8–16 atomic % of R and 4–11 atomic % of B, the balance being substantially Fe and inevitable impurities, in which part of Fe may be substituted by 30 atomic % or less or Co. The R—T—B alloy is melted and rapidly quenched to form an amorphous alloy, which is then pulverized, if necessary, and heat-treated. The heat treatment is preferably carried out at 550–800° C. for 1–5 hours in vacuum or in an inert gas atmosphere. Under the condition of more than 800° C. ×5 hours, crystal grains excessively grow. Such heat treatment turns the amorphous R—T—B alloy powder alloy to isotropic, fine, polycrystalline rare earth magnet powder of 0.01–0.5 μm in average crystal grain size having an $R_2T_{14}B$-type intermetallic compound as a main phase, which is suitable for resin-bonded rare earth magnets. When the average crystal grain size is 0.01 μm or less, or more than 0.5 μm, the resultant resin-bonded magnets have extremely low coercivity iHc and irreversible loss of flux. The main phase is defined as a phase occupying 50% or more of the crystal structure in a photograph taken on a cross section of the magnet powder by an electron microscope or an optical microscope. To improve the magnetic properties, the magnet powder may contain 0.001–5 atomic %, based on the R—T—B alloy composition, of at least one additional element M selected from the group consisting of Nb, W, V, Ta, Mo, Si, Al, Zr, Hf, P, C and Zn. When the amount of M is less than 0.001 atomic %, sufficient effects of M cannot be obtained. On the other hand, when the amount of M exceeds 5 atomic %, the residual magnetic flux density Br and/or coercivity iHc is decreased.

Also usable in the present invention is rare earth magnet powder based on $Sm_2Tm_{17}$, wherein Tm comprises Co, Fe and Cu as indispensable elements and may further contain at least one of Zr, Hf and Ti, and/or $SmCo_5$. Further, Sm—Tn—N alloy powder having a $Th_2Zn_{17}$, $Th_2Ni_{17}$ or $TbCu_7$-type crystal structure phase as a main phase, wherein Tn is Fe or Fe +Co may be used. In addition, Nd—Tn'—N alloy powder having a Th—$Mn_{12}$-type crystal structure phase as a main phase, wherein Tn' is Fe or Fe+Co may be used.

The rare earth magnet powder is pulverized to a smaller size than the diameter of the nozzle orifice, if necessary, and blended with a binder resin. The pulverization is carried out in an inert gas atmosphere by a bantam mill, a disc mill, a vibration mill, an attritor, a jet mill, etc. To prevent the clogging of the nozzle orifices by the magnet powder-resin compound, it is necessary that the pulverized rare earth magnet powder be classified by a sieve having smaller opening than the diameter of each nozzle orifice.

The binder resins may be thermosetting resins, thermoplastic resins or rubbers. Liquid thermosetting resins are suitable for extrusion or compression molding. Specific examples of such binder resins include epoxy resins, polyimide resins, polyester resins, phenol resins, fluoroplastics, silicone resins, etc. in a liquid state. Particularly liquid epoxy resins are preferable because of easy handling, good thermal resistance and low cost. When the resins are in a solid or powder state, it is not easy to pass them through the nozzle orifices having a diameter of 300 μm or less, because they do not have enough flowability.

The amount of the binder resin in the magnet powder-resin compound particles is preferably 0.5 weight % or more and less than 20 weight %, based on the magnet powder-resin compound. When the amount of the binder resin is less than 0.5 weight %, the binder resin cannot fully cover the rare earth magnet powder, failing to cause the rare earth magnet powder to easily pass through the nozzle orifices. If the magnet powder-resin compound containing less than 0.5 weight % of a binder resin is forced to pass through the nozzle orifices each having a diameter of 300 μm or less under severe extrusion conditions, the rare earth magnet powder is likely to separate and scattered from the extrudates because of poor binding action. On the other hand, when the amount of the binder resin exceeds 20 weight %, the resultant resin-bonded rare earth magnets have drastically deteriorated magnetic properties, because of large volume percentage of the binder resin in the resin-bonded magnets.

The molded products are preferably heat-treated for curing to prevent the change of their sizes and/or the deterioration of their magnetic properties. The heat treatment conditions for curing are 100–200° C. for 0.5–5 hours in the air or in an inert gas atmosphere such as an Ar gas. When the conditions are less than 100° C. ×0.5 hours, sufficient polymerization reaction for heat curing does not take place. On the other hand, when they exceed 200° C. ×5 hours, the effects of the heat treatment level off. Particularly by the heat-curing treatment in an Ar gas atmosphere, the resultant resin-bonded rare earth magnets are provided with high $(BH)_{max}$.

The present invention will be described in detail referring to the following without intention of limiting the present invention thereto.

EXAMPLE 1

Used for rare earth magnet powder was isotropic MQP-B magnet powder available from Magne-Quench International (MQI) having an average crystal grain size of 0.06–0.11 μm and a basic composition of $Nd_{11.7}Fe_{82.3}B_{6.0}$ (atomic %). This magnet powder was in the shape of an irregular flat plate having a thickness of 20–40 μm and the maximum length of about 500–600 μm. This magnet powder was pulverized in a nitrogen gas atmosphere by a bantam mill and then classified to 125 μm or less. 100 weight % of the pulverized magnet powder was blended with 2.5 weight % of a liquid epoxy resin and charged into a double-screw extruder heated at about 90° C. for pre-blending to produce pellets.

Next, the pre-blended pellets were charged into an extruder shown in FIG. 13(a), in which the pellets 1 were blended in a softened state and conveyed toward the nozzle 4 mounted to a downstream end of the extruder by the rotation of a screw 2. The nozzle 4 is in a semicircular dome shape to achieve high efficiency in extrusion pressure conveyance. The resultant blend conveyed by the screw 2 was finally extruded through a large number of orifices 7 of the nozzle 4 each having a diameter of 0.2 mm to form substantially cylindrical, fine pellets each having substantially the same diameter as that of the nozzle orifice 7.

The magnet powder-resin compound was spontaneously destroyed to elongated compound particles each having a length about 100–500 times the diameter thereof immediately after extrusion. The resultant elongated compound particles (substantially cylindrical, fine pellets) P were placed on a rotatable pan 11 of a rotary pelletizer shown in FIG. 13(b) and rotated at 466 rpm. During the rotation, the elongated compound particles P were contacted with and impinged against grooves 21 (not shown) on a surface of the rotatable pan 11 and a pair of baffle blades 12. As a result, the elongated compound particles P were divided to the length almost equal to their diameter and turned to a round shape. Rounded, fine compound particles R were withdrawn from the rotary pelletizer by opening a valve 16a.

Because the resultant round-shaped, fine, magnet powder-resin compound particles were somewhat sticky, they were heat-treated at 120° C. for 1 hour and then coated with 0.05 weight % of calcium stearate as a lubricant to provide the round, fine, magnet powder-resin compound particles for compression molding. The heat treatment conditions are preferably 90–150° C. for 0.5–1.5 hours, more preferably 90–120° C. for 0.5–1.5 hours. In the case of less than 90° C. for 0.5 hours, stickiness is not sufficiently removed from the magnet powder-resin compound particles. On the other hand, in the case of more than 150° C. for 1.5 hours, polymerization proceeds excessively to make the resultant resin-bonded magnets have a high density.

Figure 1:
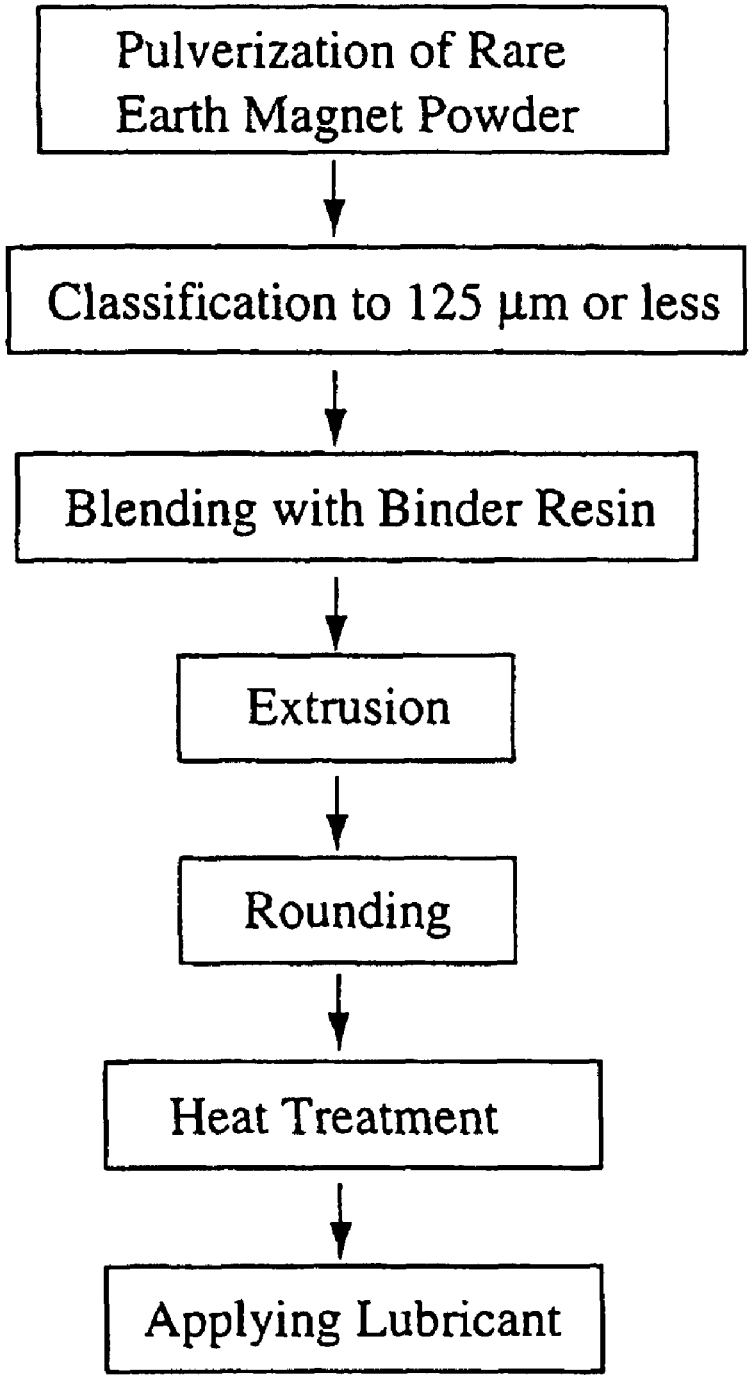
FIG. 1 is a flow chart showing the steps of producing the magnet powder-resin compound particles according to the present invention.
Figure 2:
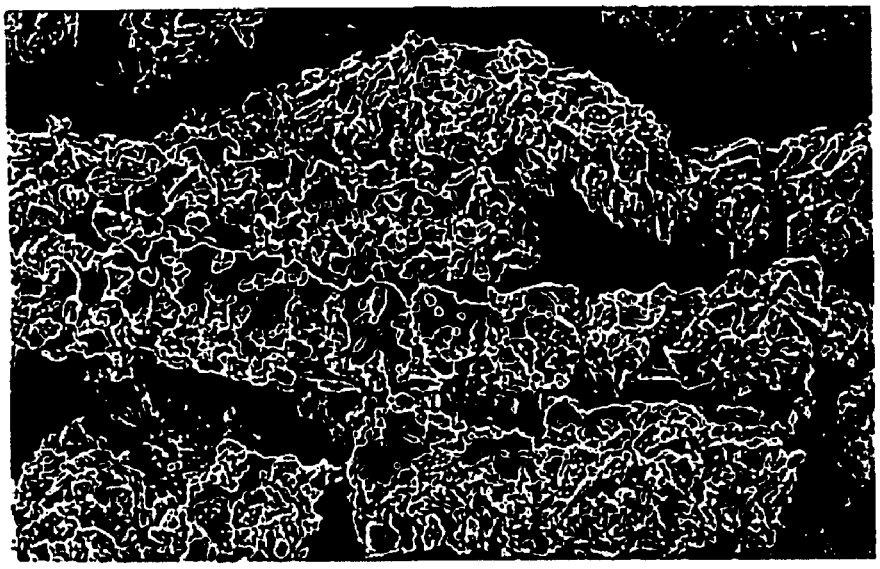
FIG. 2 is a scanning electron microscopic photograph of the extruded substantially cylindrical, fine pellets of EXAMPLE 1.
Figure 3:
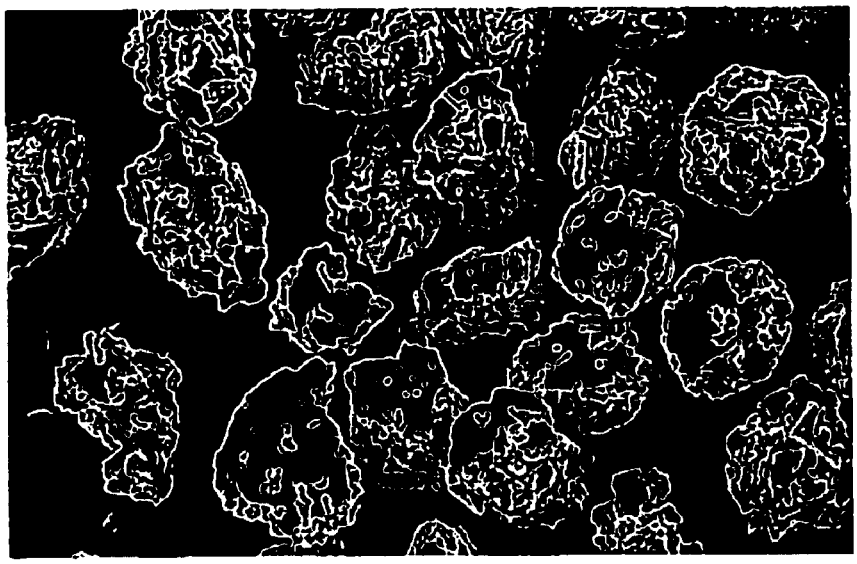
FIG. 3 is a scanning electron microscopic photograph of the rounded, fine, magnet powder-resin compound particles of EXAMPLE 1.

The above production steps are shown in FIG. 1. The extruded fine pellets each in a substantially cylindrical shape are shown in FIG. 2. Also, a typical appearance of the rounded, fine, magnet powder-resin compound particles for compression molding is shown in FIG. 3.

COMPARATIVE EXAMPLE 1

The pre-blended pellets (corresponding to conventional magnet powder-resin compound particles) of EXAMPLE 1 were used as pellets of COMPARATIVE EXAMPLE 1. The photomicrograph of pellets is shown in FIG. 4.

It is clear from FIG. 2 that the extruded substantially cylindrical, fine pellets had substantially the same diameter as that of the nozzle orifices, though they had slightly irregular surfaces.

Figure 4:
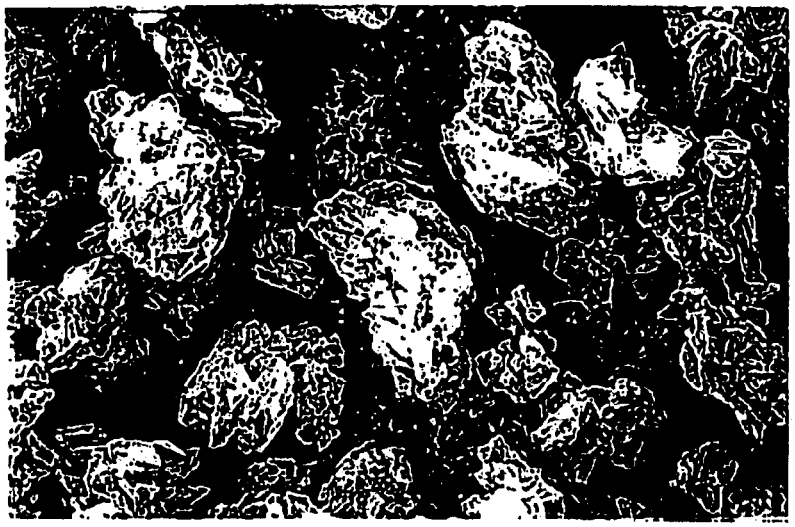
FIG. 4 is a scanning electron microscopic photograph of the pellets of COMPARATIVE EXAMPLE 1 (corresponding to pre-blended pellets of EXAMPLE 1)

It is also clear from FIGS. 3 and 4 that the magnet powder-resin compound particles of the present invention were provided with substantially round shape by rounding by a rotary pelletizer having a rotatable pan and baffle blades, though they were not completely spherical. 200 particles were arbitrarily sampled from the round magnet powder-resin compound particles of EXAMPLE 1 to take SEM photographs for evaluation. As a result, it was discovered that a ratio of the longitudinal size a to the transverse size b (a/b) in each magnet powder-resin composed particle was more than 1.00 and 3 or less, and that the average particle size defined by (a/b)/2 was 170 μm.

It is also clear from FIG. 3 that the magnet powder-resin compound particles of the present invention are agglomerate of a large number of magnet powder particles. To examine the size and number of magnet powder particles contained in each magnet powder-resin compound particle of the present invention, arbitrarily chosen magnet powder-resin compound particles of EXAMPLE 1 were immersed in acetone to remove the resin. As a result, it was found that the transverse size b of magnet particles contained in one magnet powder-resin compound particle was 3–20 μm, and that the number of magnet particles was contained in one magnet powder-resin compound particle was 12–53.

COMPARATIVE EXAMPLE 2

Figure 5:
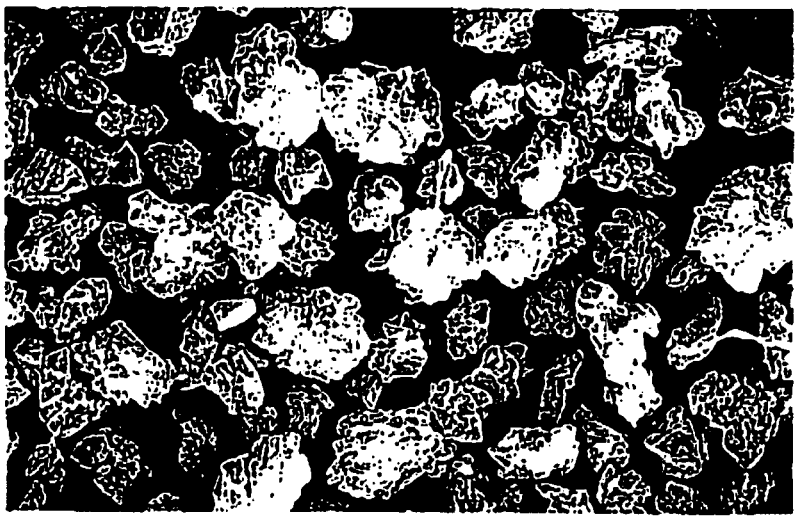
FIG. 5 is a scanning electron microscopic photograph of the extruded magnet powder-resin compound particles of COMPARATIVE EXAMPLE 2.

Magnet powder-resin compound particles for compression-molded resin-bonded magnets were produced by an extruder shown in FIG. 13(a) in the same manner as in EXAMPLE 1 except for adding 0.45 weight % of a liquid epoxy resin to the classified MQP-B powder. It was extremely difficult to extrude the magnet powder-resin compound by the extruder shown in FIG. 13(a), and extrusion was achieved only after changing the extrusion conditions of EXAMPLE 1 by elevating the extrusion temperature, etc. It was observed, however, that magnet powder was separated and scattered from the pellets immediately after extrusion. FIG. 5 shows such magnet powder-resin compound particles.

EXAMPLE 2

Magnet powder-resin compound particles of the present invention were produced in the same manner as in EXAMPLE 1 except for changing the diameter of each nozzle orifice to 50 μm, 100 μm, 150 μm, and 300 μm, respectively.

COMPARATIVE EXAMPLE 3

Magnet powder-resin compound particles were produced in the same manner as in EXAMPLE 1 except for changing the diameter of each nozzle orifice to 400 μm.

With respect to the magnet powder-resin compound particles of EXAMPLE 1 (extruded through nozzle orifices of 200 μm in diameter) and four types of magnet powder-resin compound particles of EXAMPLE 2 (extruded through nozzle orifices of 50 μm, 100 μm, 150 μm and 300 μm, respectively, in diameter), the easiness of supplying powder to the die cavity was evaluated by a flowability-measuring apparatus according to JIS is Z2502. First, each of the above magnet powder-resin compound particles was charged in the amount of 80 g into the flowability-measuring apparatus to measure the time period during which each magnet powder-resin compound particles passed through an aperture (diameter: 2 mm) of the flowability-measuring apparatus. Next, the weight of the magnet powder-resin compound particles falling from the above aperture per unit time period was calculated. The same flowability measurement was carried out on the pellets of COMPARATIVE EXAMPLE 1 and the magnet powder-resin compound particles of COMPARATIVE EXAMPLE 3. The results are shown in Table 1. It is clear from Table 1 that the magnet powder-resin compound particles have improved flowability when the nozzle orifices through which they were produced had an opening diameter of 50–300 μm.

TABLE 1

| Magnet Powder Resin Compound Particles | Diameter of Nozzle Orifice (μm) | Flowability (g/sec.) |
|---|---|---|
| EXAMPLES 1, 2 | 50 | 2.43 |
| | 100 | 2.35 |
| | 150 | 2.31 |
| | 200 | 2.07 |
| | 300 | 1.84 |
| COM. EX. 1 | — | 1.65 |
| COM. EX. 3 | 400 | 1.66 |

EXAMPLE 3

Figure 6A:
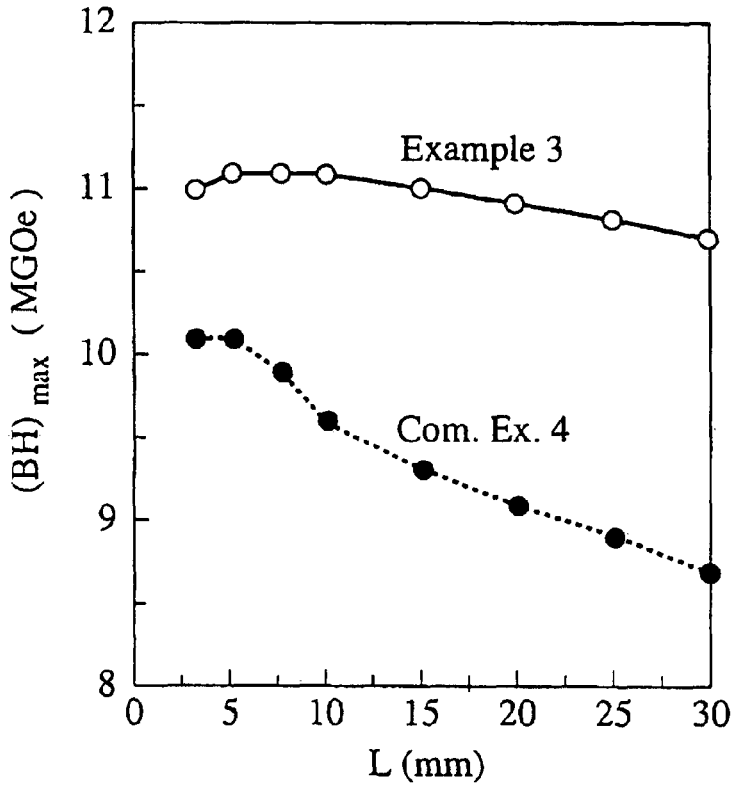
FIG. 6(a) is a graph showing the relation between maximum energy product $(BH)_{max}$ and length in EXAMPLE 3 and COMPARATIVE EXAMPLE 4.

The magnet powder-resin compound particles of EXAMPLE 1 were compression-molded to produce isotropic, resin-bonded rare earth magnets. Because the magnet powder-resin compound particles of EXAMPLE 1 were so spherical in shape that they were expected to be excellent in pressure conveyability, a compression molding die having a cavity of 10 mm in diameter was used. Various amounts of the magnet powder-resin compound particles were charged into the cavity of the compression-molding die such that the cavity was filled at various depths in a compression direction. Under a compression molding pressure of 6 tons/cm$^2$, solid-cylindrical, resin-bonded rare earth magnets of 3–30 mm in height L were produced. Each of the moldings was heat-cured to provide isotropic, resin-bonded rare earth magnets. FIG. 6(a) shows by white circles the relation between the maximum energy product $(BH)_{max}$ and the height L in the resultant resin-bonded rare earth magnets at 20° C. All of the resultant isotropic, resin-bonded rare earth magnets had a density of more than 6.1 g/cm$^3$, and the deviation of their outer peripheries from the circle (out of roundness) was as small as 4–7 μm.

Figure 6B:
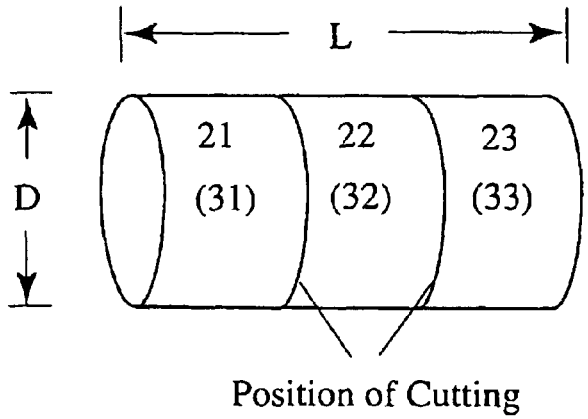
FIG. 6(b) is a perspective view showing positions of cutting a long, resin-bonded rare earth magnet sample for the measurement of density distributions.

Next, a resin-bonded rare earth magnet with L=10 mm was chosen among them and cut to three pieces of the same length along the L direction as shown in FIG. 6(b) to measure a density distribution. As a result, the density was 6.19 g/cm$^3$ in a left end portion (No. 21), 6.02 g/cm$^3$ in a center portion (No. 22), and 6.18 g/cm$^3$ in a right end portion (No. 23). Further, a resin-bonded rare earth magnet with L=30 mm was cut to 10 pieces of the same length along the L direction to measure a density distribution. As a result, the density was 6.17 g/cm$^3$, highest in a left end portion, 6.01–6.02 g/cm$^3$, lowest in two center portions, and 6.16 g/cm$^3$, second highest in a right end portion.

COMPARATIVE EXAMPLE 4

Isotropic, resin-bonded rare earth magnets with L=3–30 mm were produced for evaluation in the same manner as in EXAMPLE 3 except for using the pellets of COMPARATIVE EXAMPLE 1. The measurement results are shown by black circles in FIG. 6(a). The isotropic, resin-bonded rare earth magnets had densities less than 6.0 g/cm$^3$ as shown by black circles in FIG. 6(a), and the deviation of their peripheral dimension from the circle was as large as 16–26 μm.

Next, a resin-bonded rare earth magnet with L=10 mm was chosen among those indicated by black circles in FIG. 6(a), and cut to three pieces of the same length along the L direction to measure a density distribution in the same manner as in EXAMPLE 3. As a result, the density was 5.98 g/cm$^3$ in a left end portion (No. 31), 5.41 g/cm3 in a center portion (No. 32), and 5.96 g/cm$^3$ in a right end portion (No. 33). Further, a resin-bonded rare earth magnet with L=30 mm was chosen among those indicated by black circles in FIG. 6(a), and cut to 10 pieces of the same length along the L direction to measure a density distribution. As a result, the density was 5.97 g/cm$^3$, highest in a left end portion, 5.38–5.40 g/cm$^3$, lowest in two center portions, and 5.96 g/cm$^3$, second highest in a right end portion.

As shown in FIG. 6(a), when the magnet powder-resin compound particles of EXAMPLE 1 were used, the highest maximum energy product $(BH)_{max}$ of 11.1 MGOe was obtained at L=5–10 mm. The maximum energy product $(BH)_{max}$ was 10.7 MGOe even at L=30 mm, suffering as small decrease as 3.6%. On the other hand, when the pellets of COMPARATIVE EXAMPLE 1 were used, $(BH)_{max}$ decreased drastically as L increased. Though $(BH)_{max}$ of the resin-bonded rare earth magnet was 10.1 MGOe at L=5 mm, for instance, it decreased to 8.7 MGOe at L=30 mm, suffering as large decrease as about 14%. Remarkable differences in $(BH)_{max}$, peripheral dimension, circularity, density and density distribution between EXAMPLE 3 and COMPARATIVE EXAMPLE 4 reflect differences in magnet powder-resin compound particles between EXAMPLE 1 and the pellets of COMPARATIVE EXAMPLE 1.

Next, each of the magnet powder-resin compound particles of EXAMPLE 1 and the pellets of COMPARATIVE EXAMPLE 1 was compressed in a compression molding die cavity of 50 mm in diameter to form solid-cylindrical, resin-bonded magnet having a diameter D of 50 mm and a height L of 50 mm. After heat curing, each solid-cylindrical, resin-bonded magnet was cut to 10 pieces of the same length along the L direction to measure a density distribution in both end portions and center portions. As a result, both end portions had the highest density, while the center portions had the lowest density.

Difference in density between the end portions and the center portions was less than 0.3 g/cm$^3$ in the case of using the magnet powder-resin compound particles of EXAMPLE 1, while it was much lager than 0.3 /cm$^3$ in the case of using the pellets of COMPARATIVE EXAMPLE 1. This proves that there is a large unevenness in density in the resin-bonded rare earth magnets formed from pellets outside the present invention. Also, with respect to heat-cured, resin-bonded rare earth magnets, the deviation of their outer peripheries from the circle was less than 10 μm in the case of using the magnet powder-resin compound particles of EXAMPLE 1, while it was as large as more than 15 μm in the case of using the pellets of COMPARATIVE EXAMPLE 1.

It has been verified from the above data that the magnet powder-resin compound particles of the present invention are much superior to the pellets of COMPARATIVE EXAMPLE 1 in the easiness of supplying powder and pressure conveyability during the compression molding operation. Also, in the case of D≦50 mm and L≦50 mm, more preferably D ≦30 mm and L=3–50 mm in the isotropic, solid-cylindrical, resin-bonded rare earth magnets according to the present invention, unevenness in density in each product can be greatly suppressed as compared with the conventional products. Thus, the resin-bonded rare earth magnets of the present invention have excellent circularity of the peripheral dimension together with high magnetic properties.

EXAMPLE 4

Isotropic, thin, long, ring-shaped, resin-bonded rare earth magnets each having an outer diameter of 22 mm, an inner diameter of 20 mm and a height of 11.8–12.0 mm were produced from the magnet powder-resin compound particles of EXAMPLE 1 by a compression molding method. Though the dimensional accuracy in a radial direction of the ring-shaped, resin-bonded rare earth magnet is determined by the compression molding die, the dimensional accuracy in height may largely vary depending on the easiness. of supplying powder-resin compound particles (filling density) and pressure conveyability. Accordingly, a plurality of moldings were produced to evaluate the easiness of supplying powder-resin compound particles (filling density) and pressure conveyability at various levels of height. By controlling the filling depth and compression pressure such that the molding pressure was controlled to about 5.5 tons/cm$^2$, compression molding was continuously carried out. The relation of the number of continuous compression molding operations (number of moldings) and the height of the resultant moldings is shown in FIG. 7.

COMPARATIVE EXAMPLE 5

Compression molding was continuously carried out in the same manner as in EXAMPLE 4 except for using the pellets of COMPARATIVE EXAMPLE 1. The results are shown in FIG. 7.

Figure 7:
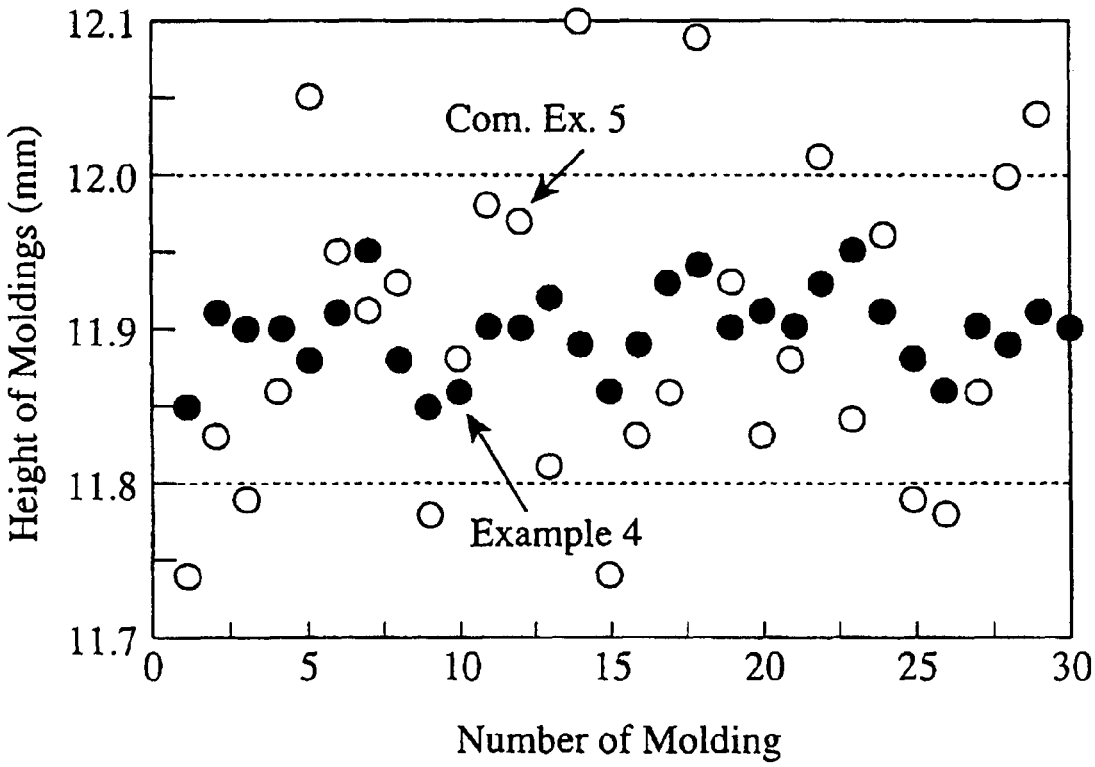
FIG. 7 is a graph showing the relation between the height distribution of thin, long, ring-shaped, resin-bonded rare earth magnets and the number of molding in EXAMPLE 4 and COMPARATIVE EXAMPLE 5.

It is clear from FIG. 7 that the resin-bonded rare earth magnets of COMPARATIVE EXAMPLE 5 continuously compression-molded from the pellets of COMPARATIVE EXAMPLE 1 had large unevenness in height, failing to meet the requirements of dimensional accuracy in height. Thus, those having a height of less than 11.8 mm were discarded, and those having a height of more than 12.0 mm were subjected to heat curing and ground to a predetermined dimension. On the other hand, the resin-bonded rare earth magnets of EXAMPLE 4 produced from the magnet powder-resin compound particles of EXAMPLE 1 met the requirements of dimensional accuracy, and they met the requirements of height without grinding after heat curing.

Table 2 shows the measurement results of height and density with respect to the continuously compression-molded resin-bonded rare earth magnets of EXAMPLE 4 and COMPARATIVE EXAMPLE 5. The continuously compression-molded resin-bonded rare earth magnets of EXAMPLE 4 had an average density of 6.09 g/cm$^3$, while those of COMPARATIVE EXAMPLE 4 had as low an average density as 5.57 g/cm$^3$.

Next, as a result of examining a density distribution in the continuously compression-molded, resin-bonded rare earth magnets of EXAMPLE 4 and COMPARATIVE EXAMPLE 5, it was found that the density was higher in both end portions and lower in a center portion in both resin-bonded rare earth magnets. In the continuously compression-molded, resin-bonded rare earth magnets of EXAMPLE 4, the difference in density between the maximum and the minimum in one resin-bonded rare earth magnet was 0.2 g/cm$^3$ or less. On the other hand, such difference in density was more than 0.3 g/cm$^3$ in COMPARATIVE EXAMPLE 5.

The resin-bonded rare earth magnets having a height of 11.90 mm and a density of 6.10 g/cm$^3$ in EXAMPLE 4, and those having a height of 11.90 mm and a density of 5.56 g/cm$^3$ in COMPARATIVE EXAMPLE 5 were subjected to heat curing. Thereafter, each heat-cured, resin-bonded rare earth magnet was magnetized until its magnetic flux was saturated, to measure the magnetic flux. Difference in magnetic flux was appreciated in proportion to the difference in density between the two resin-bonded rare earth magnets.

TABLE 2

| No. | | Height (mm) | Weight (g) | Density (g/cm$^3$) |
|---|---|---|---|---|
| Ex. 4 | Max. | 11.95 | 4.81 | 6.10 |
| | Av. | 11.90 | 4.78 | 6.09 |
| | Min. | 11.85 | 4.75 | 6.08 |
| Com. | Max. | 12.10 | 4.53 | 5.67 |
| Ex. 5 | Av. | 11.90 | 4.37 | 5.57 |
| | Min. | 11.74 | 4.25 | 5.49 |

EXAMPLE 5

Figure 8:
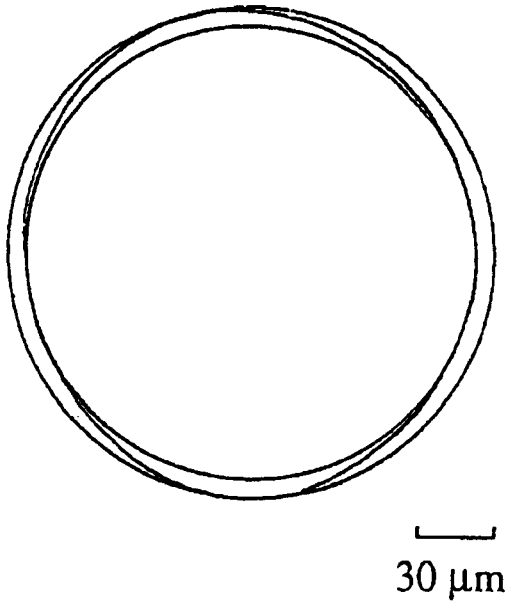
FIG. 8(a) is a view showing the circularity of an outer periphery of the highest sample among the thin, long, ring-shaped, resin-bonded rare earth magnets of EXAMPLE 4.
FIG. 8(b) is a view showing the circularity of an outer periphery of the lowest sample among the thin, long, ring-shaped, resin-bonded rare earth magnets of EXAMPLE 4.
Figure 8:
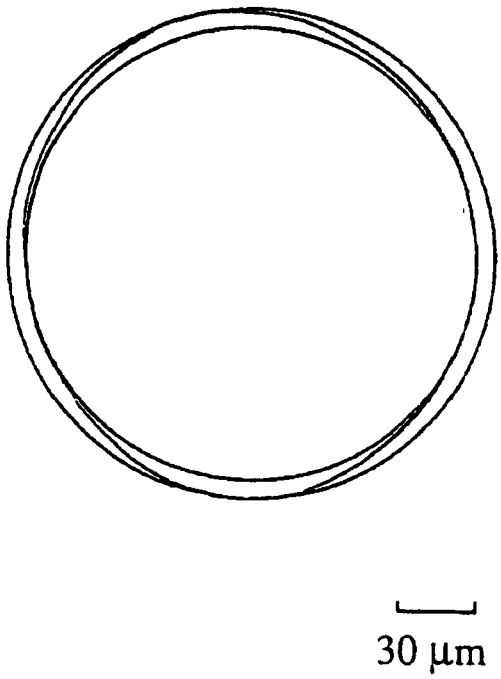
Figure 9:
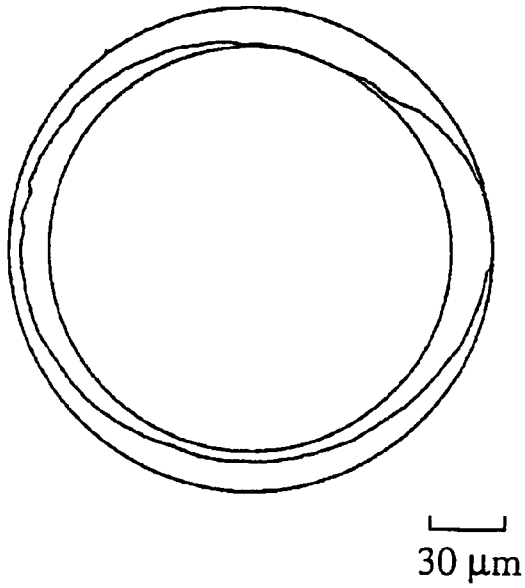
FIG. 9(a) is a view showing the circularity of an outer periphery of the highest sample among the thin, long, ring-shaped, resin-bonded rare earth magnets of COMPARATIVE EXAMPLE 5.
FIG. 9(b) is a view showing the circularity of an outer periphery of the lowest sample among the thin, long, ring-shaped, resin-bonded rare earth magnets of COMPARATIVE EXAMPLE 5.
Figure 9:
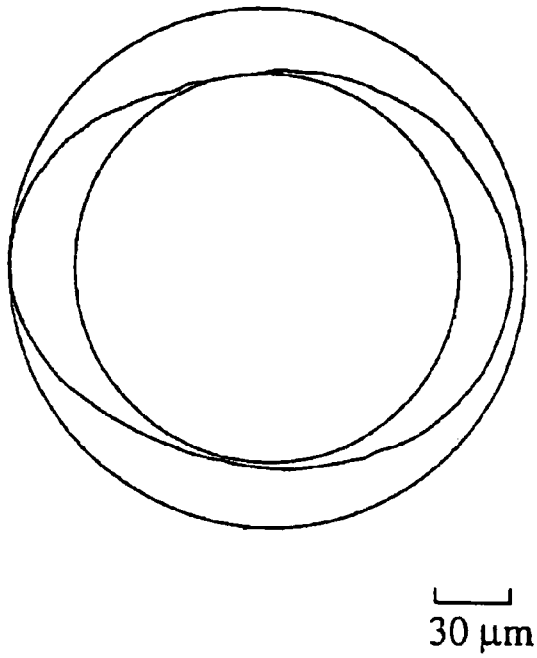

The thin, long, ring-shaped, resin-bonded rare earth magnets of EXAMPLE 4 were heat-cured and then measured with respect to the circularity of their outer peripheries. The results are shown in FIG. 8. Also, the thin, long, ring-shaped, resin-bonded rare earth magnets of COMPARATIVE EXAMPLE 5 were heat-cured and then measured with respect to the circularity of their outer peripheries. The results are shown in FIG. 9. The number of measured samples were two for those of the maximum height and two for those of the minimum height, in any of the thin, long, ring-shaped, resin-bonded rare earth magnets of EXAMPLE 4 and COMPARATIVE EXAMPLE 5.

It is clear from FIG. 9 that the thin, long, ring-shaped, resin-bonded rare earth magnets of COMPARATIVE EXAMPLE 5 had outer peripheries deviated from the circle by as large as 16–28 μm.

On the other hand, it is clear from FIG. 8 that the thin, long, ring-shaped, resin-bonded rare earth magnets produced from the magnet powder-resin compound particles of EXAMPLE 4 had outer peripheries extremely close to the circle, the deviation from the circle being as small as 6–8 μm.

It has thus been found that the isotropic, thin, long, ring-shaped, resin-bonded rare earth magnets produced from the magnet powder-resin compound particles of the present invention have outer peripheries whose deviation from the circle is reduced to about ½ or less (10 μm or less) of that of the conventional ones. It may be considered that the difference in the circularity of outer periphery reflects the difference in spring-back of the compression moldings, which in turn reflects the difference in the easiness of supplying powder and pressure conveyability between the magnet powder-resin compound particles of EXAMPLE 1 and the pellets of COMPARATIVE EXAMPLE 1.

EXAMPLE 6

Figure 10:
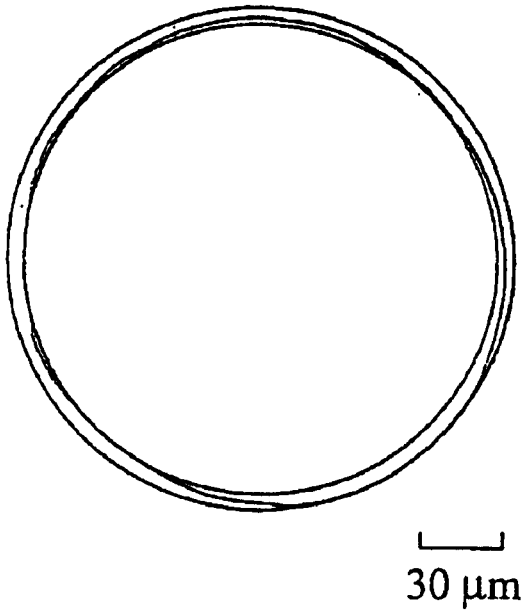
FIG. 10(a) is a view showing the circularity of an inner periphery of the highest sample among the thin, long, ring-shaped, resin-bonded rare earth magnets of EXAMPLE 4.
FIG. 10(b) is a view showing the circularity of an inner periphery of the lowest sample among the thin, long, ring-shaped, resin-bonded rare earth magnets of EXAMPLE 4.
Figure 10:
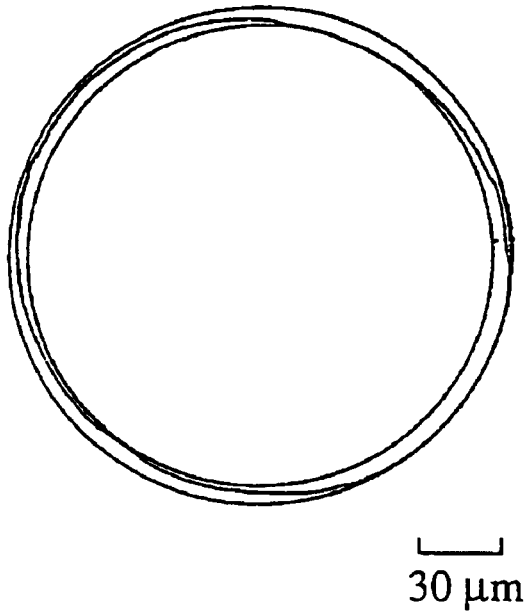
Figure 11:
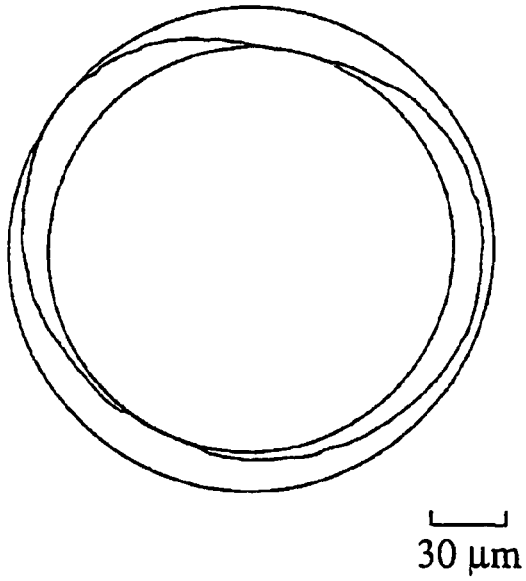
FIG. 11(a) is a view showing the circularity of an inner periphery of the highest sample among the thin, long, ring-shaped, resin-bonded rare earth magnets of COMPARATIVE EXAMPLE 5.
FIG. 11(b) is a view showing the circularity of an inner periphery of the lowest sample among the thin, long, ring-shaped, resin-bonded rare earth magnets of COMPARATIVE EXAMPLE 5.
Figure 11:
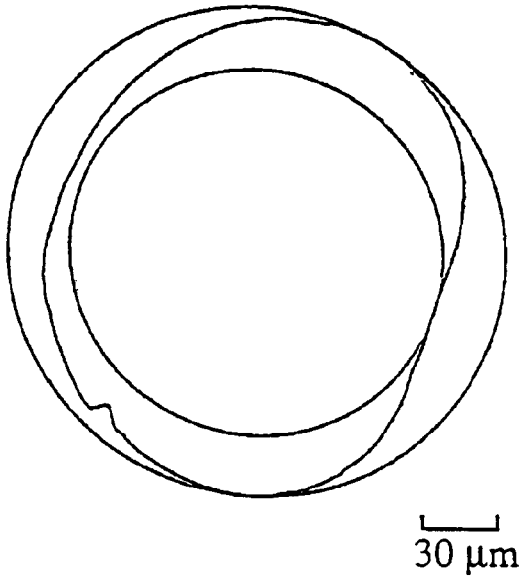

With respect to two thin, long, ring-shaped, resin-bonded rare earth magnets of the maximum height and two thin, long, ring-shaped, resin-bonded rare earth magnets of the minimum height among those shown in FIG. 8 (EXAMPLE 4), the circularity of inner periphery was measured. The results are shown in FIG. 10. Also, with respect to two thin, long, ring-shaped, resin-bonded rare earth magnets of the maximum height and two thin, long, ring-shaped, resin-bonded rare earth magnets of the minimum height among those shown in FIG. 9 (COMPARATIVE EXAMPLE 5), the circularity of inner periphery was measured. The results are shown in FIG. 11.

FIG. 10 shows that the deviation of inner periphery from the circle was as small as 5–6 μm in the thin, long, ring-shaped, resin-bonded rare earth magnets of EXAMPLE 4. Also, FIG. 11 shows that the deviation of inner periphery from the circle was as large as 16μ25 μm in the thin, long, ring-shaped, resin-bonded rare earth magnets of COMPARATIVE EXAMPLE 5.

Next, isotropic, thin, long, ring-shaped, resin-bonded rare earth magnets each having an outer diameter of 20 mm, an inner diameter of 19.4 mm, a thickness of 0.3 mm and a height of 5 mm, and those having an outer diameter of 25 mm, an inner diameter of 19 mm, a thickness of 3 mm and a height of 50 mm were produced from the magnet powder-resin compound particles of EXAMPLE 1 and the pellets of COMPARATIVE EXAMPLE 1, respectively, by a compression molding method. After heat curing, the circularity of their outer and inner peripheries was measured. In the case of using the magnet powder-resin compound particles of EXAMPLE 1, the deviation of their outer and inner peripheries from the circle was within 10 μm. On the other hand, in the case of using the pellets of COMPARATIVE EXAMPLE 1, the deviation of their outer and inner peripheries from the circle was as large as more than 15 μm.

EXAMPLE 7

Figure 12A:
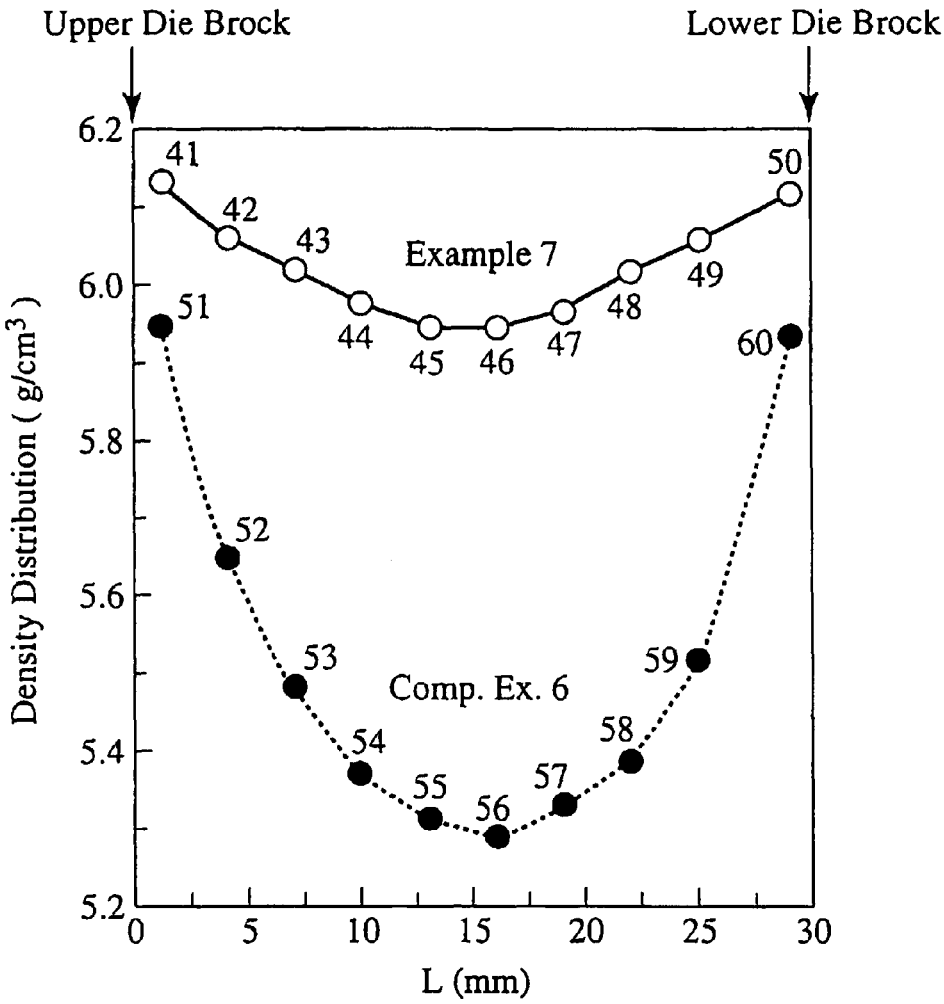
FIG. 12(a) is a graph showing the density distributions of the thin, long, ring-shaped, resin-bonded rare earth magnets along the length thereof in EXAMPLE 7 and COMPARATIVE EXAMPLE 6.
Figure 12B:
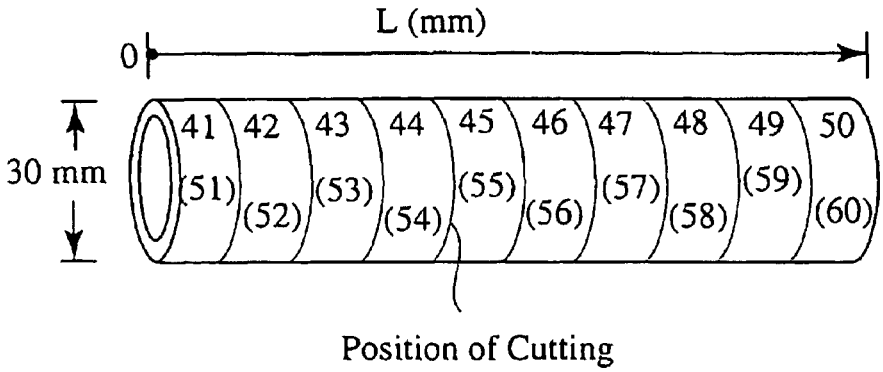
FIG. 12(b) is a perspective view showing positions of cutting a thin, long, ring-shaped, resin-bonded rare earth magnet sample for the measurement of density distributions.

The magnet powder-resin compound particles of EXAMPLE 1 were charged into a cavity of a compression molding die comprising upper and lower die blocks, and compressed at 5.8 tons/cm$^2$ between the upper and lower die blocks to form an isotropic, thin, long, ring-shaped, resin-bonded rare earth magnet having an outer diameter of 30 mm, an inner diameter of 25 mm, a thickness of 2.5 mm and a height L of 30 mm. After heat curing, the resin-bonded magnet was cut to 10 pieces of the same length along the L direction as shown in FIG. 12 (b) to measure a density distribution in each cut piece (Nos. 41–50). The results are shown by white circles in FIG. 12(a). The same numbers indicate the same pieces in FIGS. 12 (a) and (b).

COMPARATIVE EXAMPLE 6

Isotropic, thin, long, ring-shaped, resin-bonded rare earth magnets each having an outer diameter of 30 mm, an inner diameter of 25 mm, a thickness of 2.5 mm and a height L of 30 mm were produced in the same manner as in EXAMPLE 7 except for using the pellets of COMPARATIVE EXAMPLE 1. After heat curing, the resin-bonded magnet was cut to 10 pieces of the same length along the L direction as shown in FIG. 12 (b) to measure a density distribution in each cut piece (Nos. 51–60). The results are shown by black circles in FIG. 12(a). The same numbers indicate the same pieces in FIGS. 12 (a) and (b).

FIG. 12(a) shows that in the isotropic, thin, long, ring-shaped, resin-bonded rare earth magnet of EXAMPLE 7 produced from the magnet powder-resin compound particles of EXAMPLE 1, the density was 6.13 g/cm$^3$, highest in an end portion (No. 41) corresponding to an edge portion of the under die block, 6.12 g/cm$^3$, second highest in an end portion (No. 50) corresponding to an edge portion of the lower die block, and 5.95 g/cm$^3$, lowest in center portions (Nos. 45, 46). On the other hand, in the isotropic, thin, long, ring-shaped, resin-bonded rare earth magnet of COMPARATIVE EXAMPLE 6 produced from the pellets of COMPARATIVE EXAMPLE 1, the density was 5.95 g/cm3 in an end portion (No. 51) corresponding to an edge portion of the upper die block, 5.94 g/cm$^3$ in an end portion (No. 60) corresponding to an edge portion of the lower die block, 5.31 g/cm$^3$ in a center portionS (No. 55), and 5.29 g/cm$^3$ in a center portions (No. 56).

Next, the isotropic, thin, long, ring-shaped, resin-bonded rare earth magnet of EXAMPLE 7 was measured with respect to the circularity of inner and outer peripheries. As a result, their deviation from the circle was less than 10 μm. On the other hand, the deviation of inner and outer peripheries from the circle was more than 15 μm in the isotropic, thin, long, ring-shaped, resin-bonded rare earth magnet of COMPARATIVE EXAMPLE 6.

Each of the thin, long, ring-shaped, resin-bonded rare earth magnets (L=30 mm) of EXAMPLE 7 and COMPARATIVE EXAMPLE 6 was magnetized to have four magnetic poles symmetrically on the surface under the conditions of saturating magnetic flux. The magnetic flux of each resin-bonded magnet was measured. As a result, the thin, long, ring-shaped, resin-bonded rare earth magnet of EXAMPLE 7 had more magnetic flux by about 3% than that of COMPARATIVE EXAMPLE 6.

Each of the thin, long, ring-shaped, resin-bonded rare earth magnets (L=30 mm) provided with four symmetric magnetic poles of EXAMPLE 7 and COMPARATIVE EXAMPLE 6 was assembled in a rotor which was assembled in a brush-less DC motor for the evaluation of maximum efficiency. In this brush-less DC motor, an average air gap between the rotor and the stator was adjusted to 0.3 mm. The maximum efficiency of a brush-less DC motor is defined by the following formula:

$$\text{Maximum efficiency}=\{(\text{output}/\text{input})\times 100\%\}_{max},$$

wherein input (W) is current I (A)×voltage (V) applied to a winding of the rotor, and output (W) is torque (kgf·cm)× rotation speed (rpm)×0.01027, the input and the output being obtained at 1500 rpm or less.

As a result, the maximum efficiency of the brush-less DC motor was 1.3% higher in the case of using the thin, long, ring-shaped, resin-bonded rare earth magnet (L=30 mm) of EXAMPLE 7 than in the case of using the thin, long, ring-shaped, resin-bonded rare earth magnet (L=30 mm) of COMPARATIVE EXAMPLE 6. This difference in maximum efficiency is derived from differences in the magnetic flux and the circularity of outer and inner diameters between the ring-shaped, resin-bonded magnets used for the rotor.

Though the resin-bonded rare earth magnets, the magnet powder-resin compound particles for producing such resin-bonded magnets and the production method have been described above, the present invention is not restricted thereto. For instance, in place of the isotropic rare earth magnet powder, anisotropic rare earth magnet powder having an $R_2T_{14}B$-type intermetallic compound having an average crystal grain size of 0.01–0.5 μm as a main phase may be extruded and rounded in the same manner as described above, to obtain anisotropic magnet powder-resin compound particles with good flowability and pressure conveyability. These anisotropic magnet powder-resin compound particles may be compression-molded in a magnetic field to provide anistropic, resin-bonded rare earth magnets in the shapes of solid cylinder, ring, etc. with improved evenness in density distribution as well as improved magnetic properties and circularity.

As described above, the present invention provides resin-bonded rare earth magnets having good dimensional accuracy and high magnetic properties, particularly thin and/or long, resin-bonded rare earth magnets with such properties. Also, the present invention provides magnet powder-resin compound particles capable of forming into such resin-bonded rare earth magnets and the method for producing such magnet powder-resin compound particles.

What is claimed is:

1. [A] *An isotropic,* resin-bonded rare earth magnet substantially composed of an R—T—B alloy powder, wherein R is at least one rare earth element including Y, and T is Fe or Fe+Co, and a binder resin, said R—T—B alloy powder comprising an $R_2T_{14}B$[-type] intermetallic compound as a main phase and having an average crystal grain size of 0.01–0.5 μm, and wherein said resin bonded rare earth magnet is in the shape of a ring having a radial thickness of 0.3–3 mm and a length of 50 mm or less, [the] *a* deviation of an outer periphery of said resin-bonded rare earth magnet from a circle being 10 μm or less in said radial thickness of 0.3–3 mm along the circularity of an outer diameter of 50 mm or less, said resin-bonded rare earth magnet having two end portions and a center portion therebetween along the length thereof and having a density of 6.0 g/cm$^3$ or more with a density distribution showing higher density in the two end portions than in the center portion between the two end portions of the resin-bonded rare earth magnet, the difference between the highest density in the two end portions and the lowest density in the center portion being 0.3 g/cm$^3$ or less, said resin-bonded rare earth magnet having a $(BH)_{max}$ of [10.5 MGOe or more] *greater than about 10.1 MGOe, and said resin-bonded rare earth magnet being produced by a compression molding method.*

2. The *isotropic,* resin-bonded rare earth magnet according to claim 1, wherein a deviation of an inner periphery of said resin-bonded rare earth magnet from a circle is 10 μm or less in said radial thickness of 0.3–3 mm along the circularity of an outer diameter of 50 mm or less.

[3. A resin-bonded rare earth magnet substantially composed of an R—T—B alloy powder, wherein R is at least one rare earth element including Y, and T is Fe or Fe+Co, and a binder resin, said R—T—B alloy powder comprising an $R_2T_{14}B$-type intermetallic compound as a main phase and having an average crystal grain size of 0.01–0.5 μm, and wherein said resin-bonded rare earth magnet has a shape of a hollow cylinder where the hollow cylinder has an outer diameter and an inner diameter and a length which extends along an axis measured perpendicular the outer diameter and the inner diameter, the hollow cylinder having a first end portion along said axis, a second end portion along said axis and a center portion between said first end portion and said second end portion along said axis, wherein:

(outer diameter minus inner diameter)/2 is 0.3–3 mm;

length is 50 mm or less; and the deviation of the outer diameter from a true circle is 10 μm or less in said (outer diameter minus inner diameter)/2 of 0.3–3 mm along the circularity of an outer diameter of 50 mm or less, said resin-bonded rare earth magnet having a density of 6.0 g/cm$^3$ or more with a density distribution such that the density is higher in the first end portion and the second end portion than in the center portion, the difference between the highest density in the first end portion and the second end portion as compared to the lowest density in the center portion being 0.3 g/cm$^3$ or less, said resin-bonded rare earth magnet having a $(BH)_{max}$ of 10.5 MGOe or more.]

[4. The resin-bonded rare earth magnet according to claim 3, wherein a deviation of an inner periphery of said resin-bonded rare earth magnet from a circle is 10 μm or less in said radial thickness of 0.3–3 mm along the circularity of an outer diameter of 50 mm or less.]

5. [A] *An isotropic,* resin-bonded rare earth magnet substantially composed of an R—T—B alloy powder, wherein R is at least one rare earth element including Y, and T is Fe or Fe+Co, and a binder resin, said R—T—B alloy powder comprising an $R_2T_{14}B$[-type] intermetallic compound as a main phase and having an average crystal grain size of 0.01–0.5 μm, and wherein said resin-bonded rare earth magnet is in the shape of a ring having a radial thickness of 0.3–3 mm and a length of 50 mm or less, [the] *a* deviation of an outer periphery of said resin-bonded rare earth magnet from a circle being 10 μm or less in said radial thickness of 0.3–3 mm along the circularity of an outer diameter of 50 mm or less, said resin-bonded rare earth magnet having two end portions and a center portion therebetween along the length thereof and having a density of 6.0 g/cm$^3$ or more with a density distribution showing higher density in the two end portions than in the center portion between the two end portions of the resin-bonded rare earth magnet, the difference between the highest density in the two end portions and the lowest density in the center portion being 0.3 g/cm$^3$ or less, said resin-bonded rare earth magnet having a $(BH)_{max}$ of [10.5 MGOe or more,] *greater than about 10.1 MGOe, and* said resin-bonded [rarer] *rare* earth magnet being produced from [a magnet] *R—T—B alloy* powder-resin compound [particle] *particles having a flowability of 1.84–2.43 g/sec, being* produced by a method comprising the steps of charging a mixture substantially composed of [rare earth magnet] *said R—T—B alloy* powder and [a] *the* binder resin into an extruder equipped with nozzle orifices each having a diameter of 300 μm or less; extruding said mixture while blending under pressure through said nozzle orifices to form substantially cylindrical, fine pellets; and rounding said pellets by rotation.

6. The *isotropic,* resin-bonded rare earth magnet according to claim 5, wherein a deviation of an inner periphery of said resin-bonded rare earth magnet from a circle is 10 μm or less in said radial thickness of 0.3–3 mm along the circularity of an outer diameter of 50 mm or less*, and said resin-bonded rare earth magnet being produced by a compression molding method*.

[7. The resin-bonded rare earth magnet according to claims 1, 2, or 5, wherein said $(BH)_{max}$ is 10.7–11.1 MGOe.]

[8. A resin-bonded rare earth magnet substantially composed of an R—T—B alloy powder, wherein R is at least one rare earth element including Y, and T is Fe or Fe+Co, and a binder resin, said R—T—B alloy powder comprising an $R_2T_{14}B$-type intermetallic compound as a main phase and having an average crystal grain size of 0.01–0.5 μm, and wherein said resin-bonded rare earth magnet has a shape of a hollow cylinder where the hollow cylinder has an outer diameter and an inner diameter and a length which extends along an axis measured perpendicular the outer diameter and the inner diameter, the hollow cylinder having a first end portion along said axis, a second end portion along said axis and a center portion between said first end portion and said second end portion along said axis, wherein:

(outer diameter minus inner diameter)/2 is 0.3–3 mm;

length is 50 mm or less; and the deviation of the outer diameter from a true circle is 10 μm or less in said (outer diameter minus inner diameter)/2 of 0.3–3 mm along the circularity of an outer diameter of 50 mm or less, said resin-bonded rare earth magnet having a density of 6.0 g/cm$^3$ or more with a density distribution such that the density is higher in the first end portion and the second end portion than in the center portion, the difference between the highest density in the first end portion and the second end portion as compared to the lowest density in the center portion being 0.3 g/cm$^3$ or less, said resin-bonded rare earth magnet having a $(BH)_{max}$ of 10.5 MGOe or more, said resin-bonded rare earth magnet being produced from a magnet powder-resin compound particle produced by a method comprising the steps of charging a mixture substantially composed of rare earth magnet powder and a binder-resin into an extruder equipped with nozzle orifices each having a diameter of 300 μm or less; extruding said mixture while blending under pressure through said nozzle orifices to form substantially cylindrical, fine pellets; and rounding said pellets by rotation.]

[9. The resin-bonded rare earth magnet according to claim 8, wherein a deviation of an inner periphery of said resin-bonded rare earth magnet from a circle is 10 μm or less in said radial thickness of 0.3–3 mm along the circularity of an outer diameter of 50 mm or less.]

[10. The resin-bonded rare earth magnet according to claim 8, wherein said $(BH)_{max}$ is 10.7–11.1 MGOe.]

* * * * *